(12) United States Patent
Zhai et al.

(10) Patent No.: US 11,567,859 B2
(45) Date of Patent: Jan. 31, 2023

(54) METHODS AND SYSTEMS TO AUTOMATICALLY DEDUCE RELATIONSHIPS AMONG TEST STEPS

(71) Applicant: MICRO FOCUS LLC, Santa Clara, CA (US)

(72) Inventors: Hua-Ming Zhai, Shanghai (CN); Er-Xin Shang, Shanghai (CN); Kai Zhou, Shanghai (CN)

(73) Assignee: Micro Focus LLC, Santa Clara, CA (US)

( * ) Notice: Subject to any disclaimer, the term of this patent is extended or adjusted under 35 U.S.C. 154(b) by 0 days.

(21) Appl. No.: 17/205,387

(22) Filed: Mar. 18, 2021

(65) Prior Publication Data

US 2022/0300408 A1    Sep. 22, 2022

(51) Int. Cl.
   *G06F 11/36* (2006.01)
   *G06F 11/30* (2006.01)

(52) U.S. Cl.
   CPC ...... *G06F 11/3692* (2013.01); *G06F 11/3075* (2013.01); *G06F 11/3684* (2013.01); *G06F 11/3688* (2013.01)

(58) Field of Classification Search
   None
   See application file for complete search history.

(56) References Cited

U.S. PATENT DOCUMENTS 10,423,519 B2 *  9/2019  Andrejko ............ G06F 11/3684
10,423,521 B2 *  9/2019  Sharma ............... G06F 11/3688
2018/0052764 A1 *  2/2018  Kaser ................. G06F 11/3692
2020/0319996 A1 * 10/2020  Mordo ................ G06F 11/3664
2022/0019522 A1 *  1/2022  Jaros .................. G06F 8/433

OTHER PUBLICATIONS

Tahvili, "Functional Dependency Detection for Integration Test Cases", 2018, IEEE (Year: 2018).*
Haidry, "Using Dependency Structures for Prioritization of Functional Test Suites", 2018, IEEE (Year: 2013).*
Gambi, "Practical Test Dependency Detection", 2018, IEEE (Year: 2018).*
Bell, "Efficient Dependency Detection for Safe Java Test Acceleration", 2015, ACM (Year: 2015).*

* cited by examiner

*Primary Examiner* — Hossain M Morshed
(74) *Attorney, Agent, or Firm* — Sheridan Ross P.C.

(57) ABSTRACT

Embodiments of the disclosure provide systems and methods for executing a functional test on an application. According to one embodiment, a method for running a functional test on an application can comprise executing the function test on the application. The functional test can comprise a plurality of steps. The plurality of steps can comprise a set of related steps having one or more relationships between each other and a set of one or more independent steps having no relationships to other steps in the plurality of steps. The one or more relationships between the set of related steps can be deduced and an indication of the deduced one or more relationships between the set of related steps can be saved. The functional test can then be replayed on the application based on the saved indication of the deduced one or more relationships between the set of related steps.

20 Claims, 10 Drawing Sheets

METHODS AND SYSTEMS TO AUTOMATICALLY DEDUCE RELATIONSHIPS AMONG TEST STEPS

FIELD OF THE DISCLOSURE

Embodiments of the present disclosure relate generally to methods and systems for performing functional testing on an application and more particularly to identifying relationships between steps of a functional test and executing related steps in serial and unrelated steps in parallel.

BACKGROUND

The development lifecycle of a software application is an iterative process of development and testing. To find defects in the application as early as possible, automatic functional testing is used. Automated functional testing traditionally employs an automation script which consists of operations to be performed on the Application Under Test (AUT). These operations are operating on the AUT at a user level, i.e. testing the application through a user interface of the application. In most cases the functional tests are written or recorded in a serial sequence of steps. Under prior approaches, the speed and efficiency of these tests cannot be improved by running the steps in parallel because some of the successive steps may depend on run results of previous steps. Hence, there is a need for improved methods and systems for automatically deduce the relationships among test steps to identify which steps can be run in parallel to improve performance of the tests.

BRIEF SUMMARY

Embodiments of the disclosure provide systems and methods for identifying relationships between steps of a functional test and executing related steps in serial and unrelated steps in parallel. According to one embodiment, a method for running a functional test on an application can comprise executing the function test on the application. The functional test can comprise a plurality of steps. The plurality of steps can comprise a set of related steps having one or more relationships between each other and a set of one or more independent steps having no relationships to other steps in the plurality of steps. The one or more relationships between the set of related steps can be deduced and an indication of the deduced one or more relationships between the set of related steps can be saved. The functional test can then be replayed on the application based on the saved indication of the deduced one or more relationships between the set of related steps. Replaying the functional test on the application based on the saved indication of the deduced one or more relationships between the set of related steps can comprise executing the set of related steps in serial with each other and executing the set of independent steps in parallel with each other and in parallel with the set of related steps.

Deducing the one or more relationships between the set of related steps can comprise determining whether a step of the plurality of steps causes a window or page navigations. In response to determining the step causes a window or page navigation, it can be deduced that the step that causes the window or page navigation is related to a previous step in the plurality of steps.

Additionally, or alternatively, deducing the one or more relationships between the set of related steps can comprise adding a flag on each object of each step of the plurality of steps prior to executing the step and determining whether the flag exists on each object of each step after executing the step. In response to determining the flag on each object of a first step exists after executing the first step, a deduction can be made that the first step is an independent step. In response to determining the flag on any object of a second step does not exist after executing the second step, it can be deduced that the second step is related to a previous, third step in the plurality of steps.

Deducing the one or more relationships between the set of related steps can additionally, or alternatively, comprise adding an event listener on one or more objects of at least one step prior to execution of the step and determining whether the event listener detected a change event on the one or more objects of the at least one step during execution of the at least one step. In response to determining the event listener detected the change event during execution of the at least one step, a deduction can be made that the at least one step is related to a previous step in the plurality of steps. In response to determining the event listener did not detect the event change during execution of the at least one step, it can be deduced that the at least one step is an independent step.

Additionally, or alternatively, deducing the one or more relationships between the set of related steps can comprise capturing a first snapshot of each object of each step of the plurality of steps prior to executing each step, capturing a second snapshot of each object of each step of the plurality of steps after executing the step, and comparing the first snapshot of each object of each step of the plurality of steps to the second snapshot of each object of each step of the plurality of steps. In response to determining the first snapshot of at least one object of at least one step does not match the second snapshot of the at least one object of the at least one step based on the comparing, a deduction can be made that the at least one step is related to a previous step in the plurality of steps.

Deducing the one or more relationships between the set of related steps can additionally, or alternatively, comprise performing a first querying on properties of each object of each step of the plurality of steps prior to executing each step, performing a second query on the properties of each object of each step after execution of each step, and comparing values of the properties of each object of each step obtained from the first query to values of the properties of each object of each step obtained from the second query. In response to determining the values of the properties of at least one object of at least one step obtained from the first query do not match values of the properties of the at least one object of the at least one step obtained from the second query based on the comparing, it can be deducing that the at least one step is related to a previous step in the plurality of steps.

According to another embodiment, a system can comprise a processor and a memory coupled with and readable by the processor. The memory can store therein a set of instructions which, when executed by the processor, causes the processor to run a functional test on an application by executing the function test on the application. The functional test can comprise a plurality of steps and the plurality of steps can comprise a set of related steps having one or more relationships between each other and a set of one or more independent steps having no relationships to other steps in the plurality of steps. The instructions can further cause the processor to deduce the one or more relationships between the set of related steps, save an indication of the deduced one or more relationships between the set of related steps, and replay the functional test on the application based on the saved indication of the deduced one or more relationships between the set of related steps. Replaying the functional test on the application based on the saved indication of the deduced one or more relationships between the set of related steps can comprise executing the set of related steps in serial with each other and executing the set of independent steps in parallel with each other and in parallel with the set of related steps.

Deducing the one or more relationships between the set of related steps can comprise determining whether a step of the plurality of steps causes a window or page navigations. In response to determining the step causes a window or page navigation, it can be deduced that the step that causes the window or page navigation is related to a previous step in the plurality of steps.

Additionally, or alternatively, deducing the one or more relationships between the set of related steps can comprise adding a flag on each object of each step of the plurality of steps prior to executing the step and determining whether the flag exists on each object of each step after executing the step. In response to determining the flag on each object of a first step exists after executing the first step, a deduction can be made that the first step is an independent step. In response to determining the flag on any object of a second step does not exist after executing the second step, it can be deduced that the second step is related to a previous, third step in the plurality of steps.

Deducing the one or more relationships between the set of related steps can additionally, or alternatively, comprise adding an event listener on one or more objects of at least one step prior to execution of the step and determining whether the event listener detected a change event on the one or more objects of the at least one step during execution of the at least one step. In response to determining the event listener detected the change event during execution of the at least one step, a deduction can be made that the at least one step is related to a previous step in the plurality of steps. In response to determining the event listener did not detect the event change during execution of the at least one step, it can be deduced that the at least one step is an independent step.

Additionally, or alternatively, deducing the one or more relationships between the set of related steps can comprise capturing a first snapshot of each object of each step of the plurality of steps prior to executing each step, capturing a second snapshot of each object of each step of the plurality of steps after executing the step, and comparing the first snapshot of each object of each step of the plurality of steps to the second snapshot of each object of each step of the plurality of steps. In response to determining the first snapshot of at least one object of at least one step does not match the second snapshot of the at least one object of the at least one step based on the comparing, a deduction can be made that the at least one step is related to a previous step in the plurality of steps.

Deducing the one or more relationships between the set of related steps can additionally, or alternatively, comprise performing a first querying on properties of each object of each step of the plurality of steps prior to executing each step, performing a second query on the properties of each object of each step after execution of each step, and comparing values of the properties of each object of each step obtained from the first query to values of the properties of each object of each step obtained from the second query. In response to determining the values of the properties of at least one object of at least one step obtained from the first query do not match values of the properties of the at least one object of the at least one step obtained from the second query based on the comparing, it can be deducing that the at least one step is related to a previous step in the plurality of steps.

According to yet another embodiment, a non-transitory, computer-readable medium can comprise a set of instructions stored therein which, when executed by a processor, causes the processor to run a functional test on an application by executing the function test on the application. The functional test can comprise a plurality of steps and the plurality of steps can comprise a set of related steps having one or more relationships between each other and a set of one or more independent steps having no relationships to other steps in the plurality of steps. The instructions can further cause the processor to deduce the one or more relationships between the set of related steps, save an indication of the deduced one or more relationships between the set of related steps, and replay the functional test on the application based on the saved indication of the deduced one or more relationships between the set of related steps. Replaying the functional test on the application based on the saved indication of the deduced one or more relationships between the set of related steps can comprise executing the set of related steps in serial with each other and executing the set of independent steps in parallel with each other and in parallel with the set of related steps.

Deducing the one or more relationships between the set of related steps can comprise determining whether a step of the plurality of steps causes a window or page navigations. In response to determining the step causes a window or page navigation, it can be deduced that the step that causes the window or page navigation is related to a previous step in the plurality of steps.

Additionally, or alternatively, deducing the one or more relationships between the set of related steps can comprise adding a flag on each object of each step of the plurality of steps prior to executing the step and determining whether the flag exists on each object of each step after executing the step. In response to determining the flag on each object of a first step exists after executing the first step, a deduction can be made that the first step is an independent step. In response to determining the flag on any object of a second step does not exist after executing the second step, it can be deduced that the second step is related to a previous, third step in the plurality of steps.

Deducing the one or more relationships between the set of related steps can additionally, or alternatively, comprise adding an event listener on one or more objects of at least one step prior to execution of the step and determining whether the event listener detected a change event on the one or more objects of the at least one step during execution of the at least one step. In response to determining the event listener detected the change event during execution of the at least one step, a deduction can be made that the at least one step is related to a previous step in the plurality of steps. In response to determining the event listener did not detect the event change during execution of the at least one step, it can be deduced that the at least one step is an independent step.

Additionally, or alternatively, deducing the one or more relationships between the set of related steps can comprise capturing a first snapshot of each object of each step of the plurality of steps prior to executing each step, capturing a second snapshot of each object of each step of the plurality of steps after executing the step, and comparing the first snapshot of each object of each step of the plurality of steps to the second snapshot of each object of each step of the plurality of steps. In response to determining the first snapshot of at least one object of at least one step does not match the second snapshot of the at least one object of the at least one step based on the comparing, a deduction can be made that the at least one step is related to a previous step in the plurality of steps.

Deducing the one or more relationships between the set of related steps can additionally, or alternatively, comprise performing a first querying on properties of each object of each step of the plurality of steps prior to executing each step, performing a second query on the properties of each object of each step after execution of each step, and comparing values of the properties of each object of each step obtained from the first query to values of the properties of each object of each step obtained from the second query. In response to determining the values of the properties of at least one object of at least one step obtained from the first query do not match values of the properties of the at least one object of the at least one step obtained from the second query based on the comparing, it can be deducing that the at least one step is related to a previous step in the plurality of steps.

Figure 1:
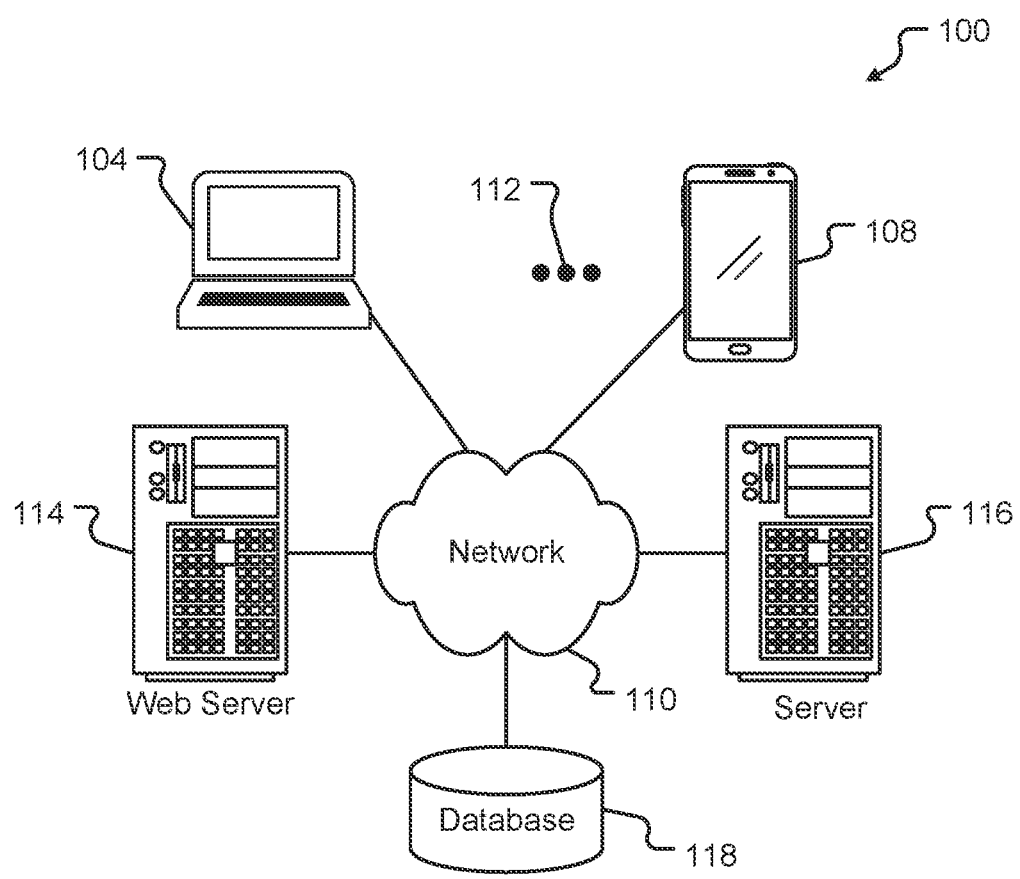
FIG. 1 is a block diagram illustrating elements of an exemplary computing environment in which embodiments of the present disclosure may be implemented.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a Local-Area Network (LAN) and/or Wide-Area Network (WAN) such as the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, Non-Volatile Random-Access Memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a Compact Disk Read-Only Memory (CD-ROM), any other optical medium, punch cards, paper tape, any other physical medium with patterns of holes, a Random-Access Memory (RAM), a Programmable Read-Only Memory (PROM), and Erasable Programmable Read-Only Memory (EPROM), a Flash-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, Radio Frequency (RF), etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as Programmable Logic Device (PLD), Programmable Logic Array (PLA), Field Programmable Gate Array (FPGA), Programmable Array Logic (PAL), special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or Very Large-Scale Integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or Common Gateway Interface (CGI) script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices, such as a computing device 104, a communication device 108, and/or more 112. The computing devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 104, 108, 112 may also have any of a variety of applications, including for example, database client and/or server applications, and web browser applications. Alternatively, the computing devices 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the exemplary computer environment 100 is shown with two computing devices, any number of user computers or computing devices may be supported.

Environment 100 further includes a network 110. The network 110 may can be any type of network familiar to those skilled in the art that can support data communications using any of a variety of commercially-available protocols, including without limitation Session Initiation Protocol (SIP), Transmission Control Protocol/Internet Protocol (TCP/IP), Systems Network Architecture (SNA), Internetwork Packet Exchange (IPX), AppleTalk, and the like. Merely by way of example, the network 110 may be a Local Area Network (LAN), such as an Ethernet network, a Token-Ring network and/or the like; a wide-area network; a virtual network, including without limitation a Virtual Private Network (VPN); the Internet; an intranet; an extranet; a Public Switched Telephone Network (PSTN); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP servers, HyperText Transfer Protocol (secure) (HTTP(s)) servers, FTP servers, CGI servers, database servers, Java servers, and the like. In some instances, the web server 114 may publish operations available operations as one or more web services.

The environment 100 may also include one or more file and or/application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server 116, 114 may execute one or more web applications. The web application may be implemented as one or more scripts or programs written in any programming language, such as Java™, C, C#®, or C++, and/or any scripting language, such as Perl, Python, or Tool Command Language (TCL), as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a Storage-Area Network (SAN) familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to Structured Query Language (SQL) formatted commands.

Figure 2:
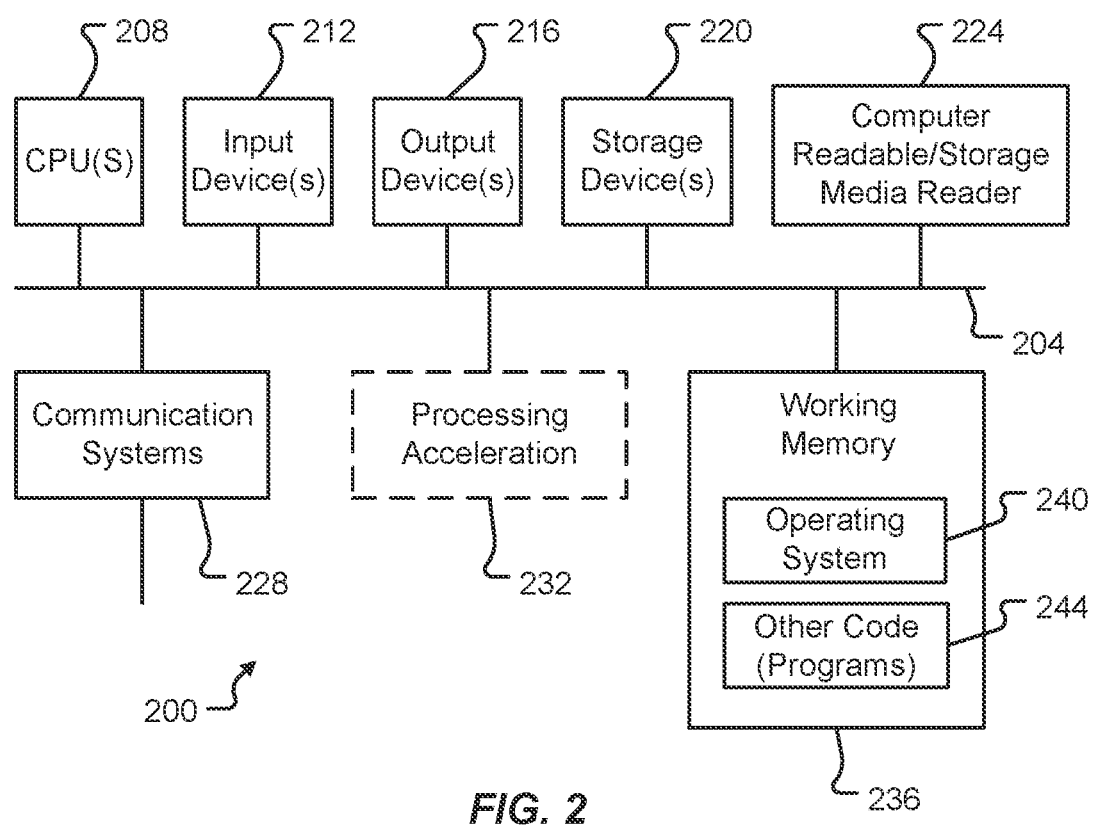
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices, or other systems or components described above may be deployed or executed. The computer system 200 is shown comprising hardware elements that may be electrically coupled via a bus 204. The hardware elements may include one or more Central Processing Units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a Random-Access Memory (RAM) and/or a Read-Only Memory (ROM), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a Digital Signal Processor (DSP), a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
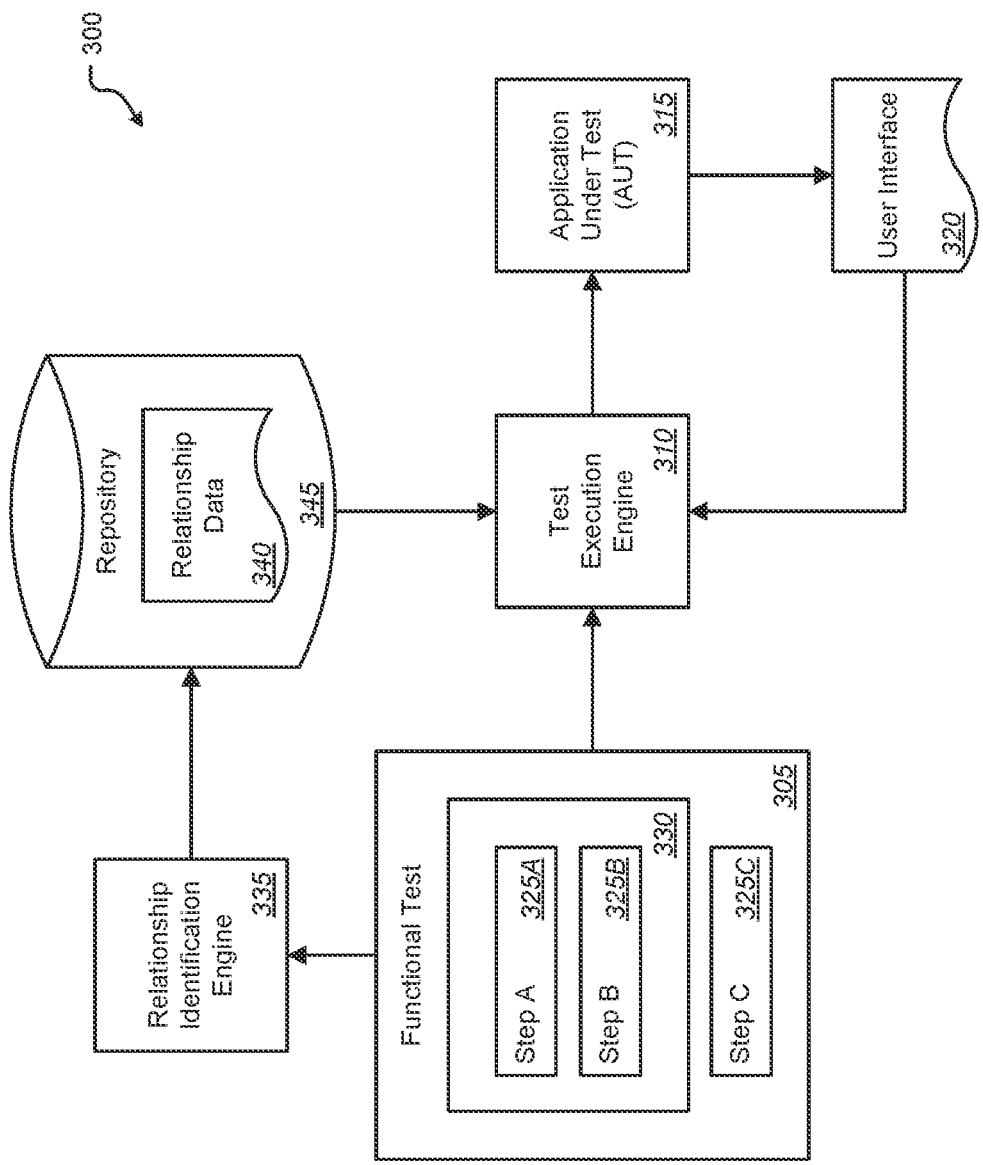
FIG. 3 is a block diagram illustrating elements of an exemplary system for performing functional testing on an application according to one embodiment of the present disclosure.

FIG. 3 is a block diagram illustrating elements of an exemplary system for performing functional testing on an application according to one embodiment of the present disclosure. As illustrated in this example, the environment can include a test system 300 such as any one or more of the servers and/or computing devices described above. Generally speaking, the test system can comprise one or more functional tests 305 executed by a test execution engine 310 to perform functional testing on an Application Under Test (AUT) 315. During normal operation, as well as under test, the AUT 315 can provide a user interface 320 comprising various graphical and/or textual elements. The functional testing engine 310 can execute the one or more functional tests 305 on the AUT 315 and user interface 320 of the AUT 315, i.e., by navigating the user interface 320, selecting various elements therein, and verifying functions of the AUT 315 associated with the selected elements.

The functional tests 305 can each define, e.g., in a script of other form executable by the test execution engine 310, a set of test functions steps 325A-325C to be performed on the AUT 315. Some of the steps 325A and 325B can be related 330 to one another, i.e., a subsequent step 325B may rely or depend on completion of a previous step 325A, while other steps 325C can be independent, i.e., not relying or depending on completion of any other step. Embodiments of the present disclosure are directed to effective and efficient execution of the functional tests 305 by executing the related steps 330 in series with each other and executing the independent steps 325C in parallel with each other and/or in parallel with the related steps 330.

Accordingly, the test system can also include a relationship identification engine 335. Generally speaking, the test execution engine 310 can execute or pre-run the functional tests 305 and the relationship identification engine 335 can, during this execution, identify the related steps 330 in the functional tests 305 and save a set of relationship data 340 in a database or other repository 345. This relationship data 340 can comprise an indication identifying the related steps 330 and/or independent steps 325C. Based on this relationship data 340, the test execution engine 310 can then, on subsequent executions of the test 305, run the functional test 310 by executing the related steps 330 in series and the independent steps 325C in parallel with each other and/or in parallel with the related steps 305.

More specifically, running a functional test 305 on the AUT 315 can comprise executing, by the test execution engine 310, the function test 305 on the AUT 315 in a first run or pre-run before any relationships between steps 325A-325C have been determined. The one or more relationships between the set of related steps 330 can be deduced by the relationship identification engine 335 from this execution of the test.

Generally speaking, deducing relationships between steps 325A-325C of the functional test 305 can be accomplished by the relationship identification engine 335 using a number of different processes. Some such processes are outlined here and described further below with reference to FIGS. 5-10. Any one or more of these processes can be performed by the relationship identification engine 335 individually or together and in any order, not only in the order described here. For example, deducing relationships between steps of the functional test can be based on the relationship identification engine 335 identifying or detecting user interface 320 window or page navigation during execution of the functional test 305. Additionally, or alternatively, the relationship identification engine 335 can set a flag on objects of the steps 325A-325C and then deduce relationships between steps 325A-325C of the functional test 305 based on changes to flags on objects of the steps 325A-325C during execution of the steps 325A-325C. Deducing relationships between steps of the functional test can additionally, or alternatively, comprise the relationship identification engine 335 setting one or more event listeners for change events and deducing relationships between the steps 325A-325C based on change events occurring during execution of the functional tests 305. The relationship identification engine 335 can additionally, or alternatively, deduce relationships between steps of the functional test 305 by comparing snapshots of objects of steps of the functional test taken before and after execution of the functional test. Deducing relationships between steps of the functional test can additionally, or alternatively comprise the relationship identification engine 335 deducing relationships between steps of a functional test based on queries of properties of objects of steps of the functional test made before and after execution of the functional test.

An indication of the deduced one or more relationships between the set of related steps can be saved by the relationship identification engine 335 in the relationship data 340. Then, each time the functional test 305 is replayed, the test execution engine 310 can perform the tests 305 based on the saved indication of the deduced one or more relationships between the set of related steps. Replaying the functional test on the application based on the saved indication of the deduced one or more relationships between the set of related steps can comprise executing the set of related steps 330 in serial with each other and executing the set of independent steps 325C in parallel with each other and in parallel with the set of related steps 330.

Figure 4:
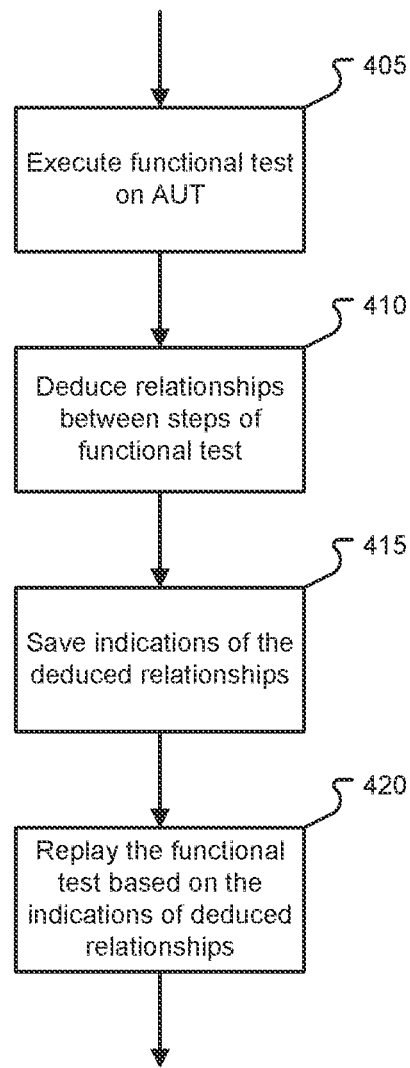
FIG. 4 is a flowchart illustrating an exemplary process for performing functional testing one an application according to one embodiment of the present disclosure.

FIG. 4 is a flowchart illustrating an exemplary process for performing functional testing one an application according to one embodiment of the present disclosure. As illustrated in this example, running a functional test on an application can comprise executing 405 the function test on the application, i.e., executing a first run before any relationships have been determined. As noted above, the functional test can comprise a plurality of steps and the plurality of steps can comprise a set of related steps having one or more relationships between each other and a set of one or more independent steps having no relationships to other steps in the plurality of steps. The one or more relationships between the set of related steps can be deduced 410 from executing the test and an indication of the deduced one or more relationships between the set of related steps can be saved 415. Details of an exemplary process for deducing 410 the relationships will be described below with reference to FIG. 5. The functional test can then be replayed 420 on the application based on the saved indication of the deduced one or more relationships between the set of related steps. Replaying 420 the functional test on the application based on the saved indication of the deduced one or more relationships between the set of related steps can comprise executing the set of related steps in serial with each other and executing the set of independent steps in parallel with each other and in parallel with the set of related steps.

Figure 5:
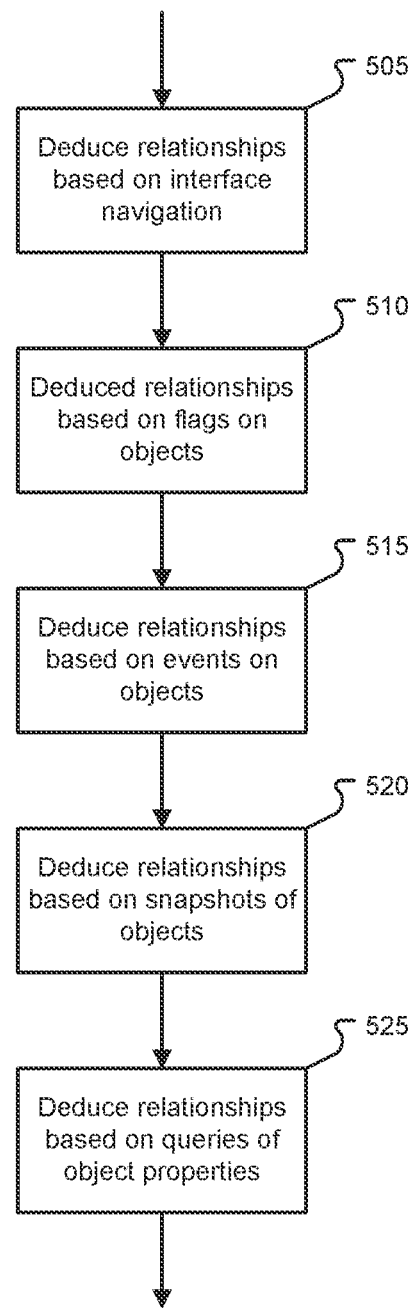
FIG. 5 is a flowchart illustrating an exemplary process for deducing relationships between steps within a functional test according to one embodiment of the present disclosure.

FIG. 5 is a flowchart illustrating an exemplary process for deducing relationships between steps within a functional test according to one embodiment of the present disclosure. Generally speaking, deducing relationships between steps of the functional test can be accomplished by a number of different processes. Some such processes are outlined here. Any one or more of these processes can be performed, individually or together, and in any order, not only in the order discussed here.

For example, deducing relationships between steps of the functional test can comprise deducing 505 relationships between steps of a functional test based on user interface window or page navigation during execution of the functional test. Additional details of an exemplary process for deducing 505 relationships between steps of a functional test based on user interface window or page navigation during execution of the functional test will be described below with reference to FIG. 6.

Additionally, or alternatively, deducing relationships between steps of the functional test can comprise deducing 510 relationships between steps of a functional test based on changes to flags on objects of the steps during execution of the steps. Additional details of an exemplary process for deducing 510 relationships between steps of a functional test based on changes to flags on objects of the steps during execution of the steps will be described below with reference to FIG. 7.

Deducing relationships between steps of the functional test can additionally, or alternatively, comprise deducing 515 relationships between steps of a functional test based on change events occurring during execution of the functional tests. Additional details of an exemplary process for deducing 515 relationships between steps of a functional test based on change events occurring during execution of the functional tests will be described below with reference to FIG. 8.

Additionally, or alternatively, deducing relationships between steps of the functional test can comprise deducing 520 relationships between steps of a functional test based on snapshots of objects of steps of the functional test taken before and after execution of the functional test. Additional details of an exemplary process for deducing 520 relationships between steps of a functional test based on snapshots of objects of steps of the functional test taken before and after execution of the functional test will be described below with reference to FIG. 9.

Deducing relationships between steps of the functional test can additionally, or alternatively comprise deducing 525 relationships between steps of a functional test based on queries of properties of objects of steps of the functional test made before and after execution of the functional test. Additional details of an exemplary process for deducing 525 relationships between steps of a functional test based on queries of properties of objects of steps of the functional test made before and after execution of the functional test will be described below with reference to FIG. 10.

Figure 6:
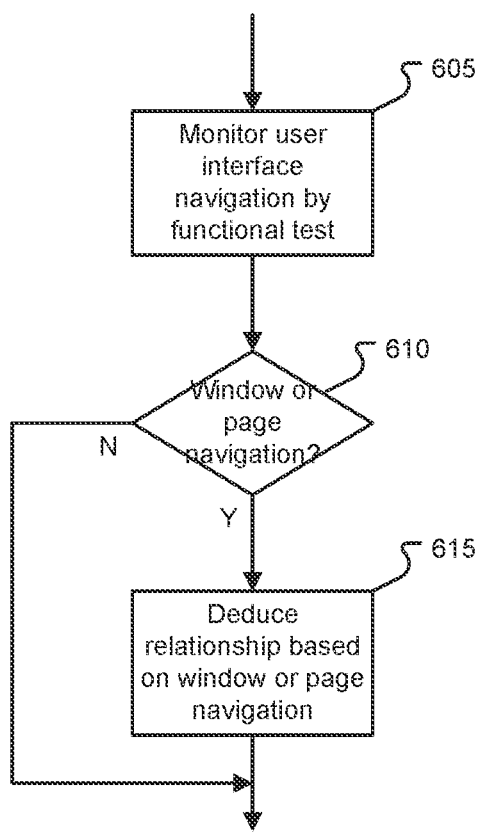
FIG. 6 is a flowchart illustrating additional details of an exemplary process for deducing relationships between steps of a functional test based on user interface window or page navigation during execution of the functional test according to one embodiment of the present disclosure.

FIG. 6 is a flowchart illustrating additional details of an exemplary process for deducing relationships between steps of a functional test based on user interface window or page navigation during execution of the functional test according to one embodiment of the present disclosure. As illustrated in this example, deducing relationships between steps of a functional test based on user interface window or page navigation during execution of the functional test can begin with monitoring 605 user interface navigation by the functional test during execution of the test. Based on this monitoring 605, a determination 610 can be made as to whether a step of the plurality of steps causes a window or page navigations. In response to determining 610 a step causes a window or page navigation, it can be deduced 615 that the step that causes the window or page navigation is related to a previous step in the plurality of steps, e.g., the immediately previous executed step. In response to determining 610 a step does not cause a window or page navigation no such deduction may be made.

Figure 7:
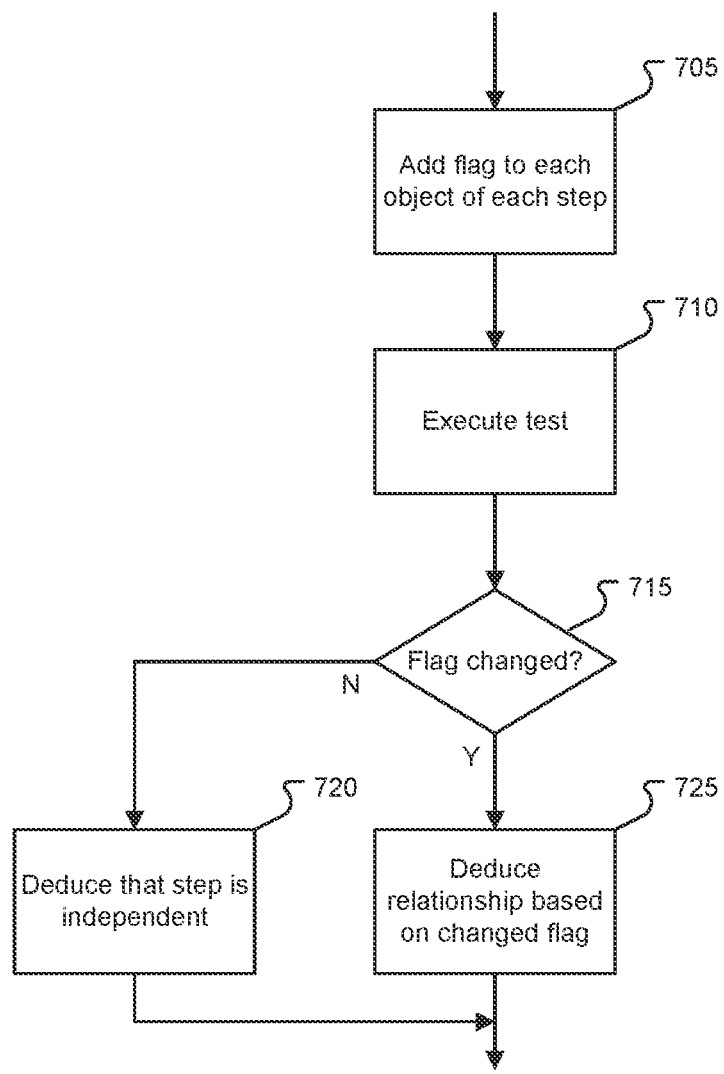
FIG. 7 is a flowchart illustrating additional details of an exemplary process for deducing relationships between steps of a functional test based on changes to flags on objects of the steps during execution of the steps according to one embodiment of the present disclosure.

FIG. 7 is a flowchart illustrating additional details of an exemplary process for deducing relationships between steps of a functional test based on changes to flags on objects of the steps during execution of the steps according to one embodiment of the present disclosure. As illustrated in this example, deducing relationships between steps of a functional test based on changes to flags on objects of the steps during execution of the steps can comprise adding 705 a flag on each object of each step of the plurality of steps prior to executing the step. The test can then be executed 710 as described above and a determination 715 can be made as to whether the flag exists on each object of each step after executing 710 the step. In response to determining 715 the flag on each object of a first step exists after executing the first step, a deduction can be made 720 that the first step is an independent step. In response to determining 715 the flag on any object of a second step does not exist after executing the second step, it can be deduced 725 that the second step is related to a previous, third step in the plurality of steps, e.g., the immediately previous executed step.

Figure 8:
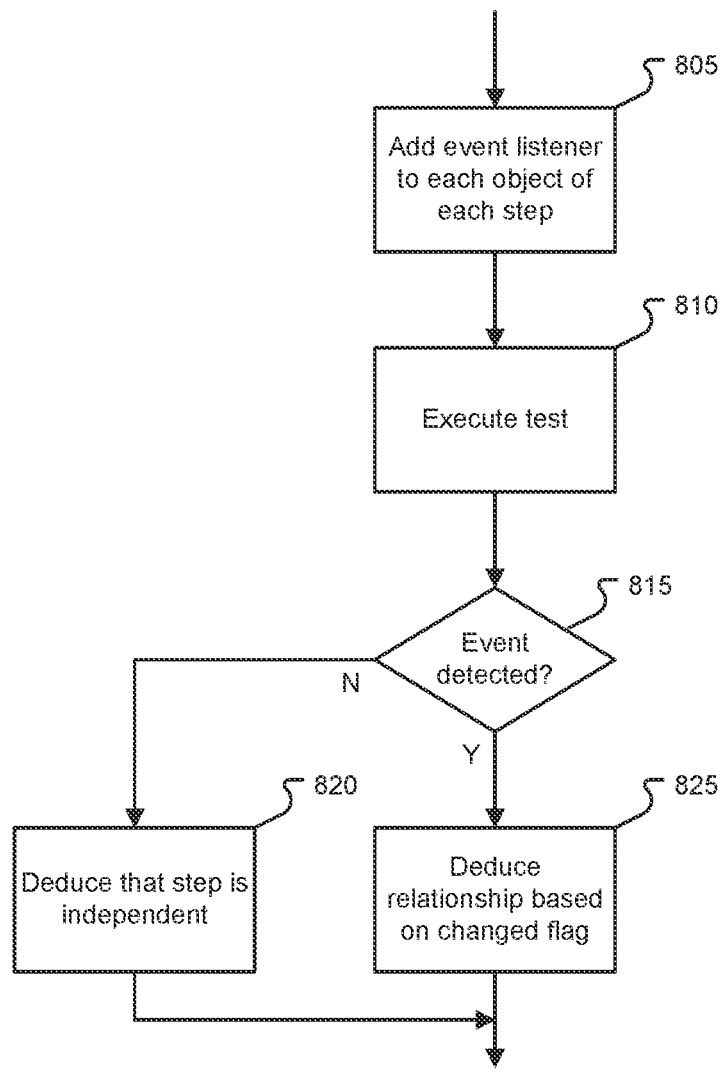
FIG. 8 is a flowchart illustrating additional details of an exemplary process for deducing relationships between steps of a functional test based on change events occurring during execution of the functional tests according to one embodiment of the present disclosure.

FIG. 8 is a flowchart illustrating additional details of an exemplary process for deducing relationships between steps of a functional test based on change events occurring during execution of the functional tests according to one embodiment of the present disclosure. As illustrated in this example, deducing relationships between steps of a functional test based on change events occurring during execution of the functional tests can comprise adding 805 an event listener on one or more objects of at least one step prior to execution of the step. The functional test can then be executed 810 and a determination 815 can be made as to whether the event listener detected a change event on the one or more objects of the at least one step during execution of the at least one step. In response to determining 815 the event listener detected the change event during execution of the at least one step, a deduction 825 can be made that the at least one step is related to a previous step in the plurality of steps, e.g., the immediately previous executed step. In response to determining 815 the event listener did not detect the event change during execution of the at least one step, it can be deduced 820 that the at least one step is an independent step.

Figure 9:
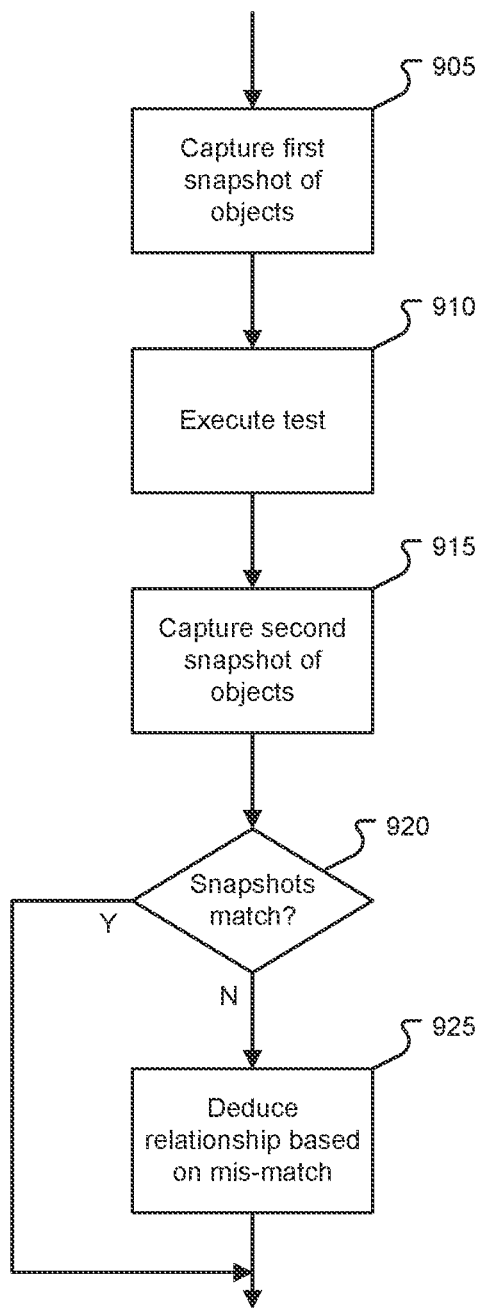
FIG. 9 is a flowchart illustrating additional details of an exemplary process for deducing relationships between steps of a functional test based on snapshots of objects of steps of the functional test taken before and after execution of the functional test according to one embodiment of the present disclosure.

FIG. 9 is a flowchart illustrating additional details of an exemplary process for deducing relationships between steps of a functional test based on snapshots of objects of steps of the functional test taken before and after execution of the functional test according to one embodiment of the present disclosure. As illustrated in this example, deducing relationships between steps of a functional test based on snapshots of objects of steps of the functional test taken before and after execution of the functional test can comprise capturing 905 a first snapshot of each object of each step of the plurality of steps prior to executing each step. The functional test can be executed 910 as described above and a second snapshot of each object of each step of the plurality of steps can be captured 915 after executing the step. A determination 920 can then be made by comparing the first snapshot of each object of each step of the plurality of steps to the second snapshot of each object of each step of the plurality of steps. In response to determining 920 the first snapshot of at least one object of at least one step does not match the second snapshot of the at least one object of the at least one step based on the comparing, a deduction 925 can be made that the at least one step is related to a previous step in the plurality of steps. In response to determining 920 the first snapshot of at least one object of at least one step matches the second snapshot of the at least one object of the at least one step based on the comparing, no deduction may be made.

Figure 10:
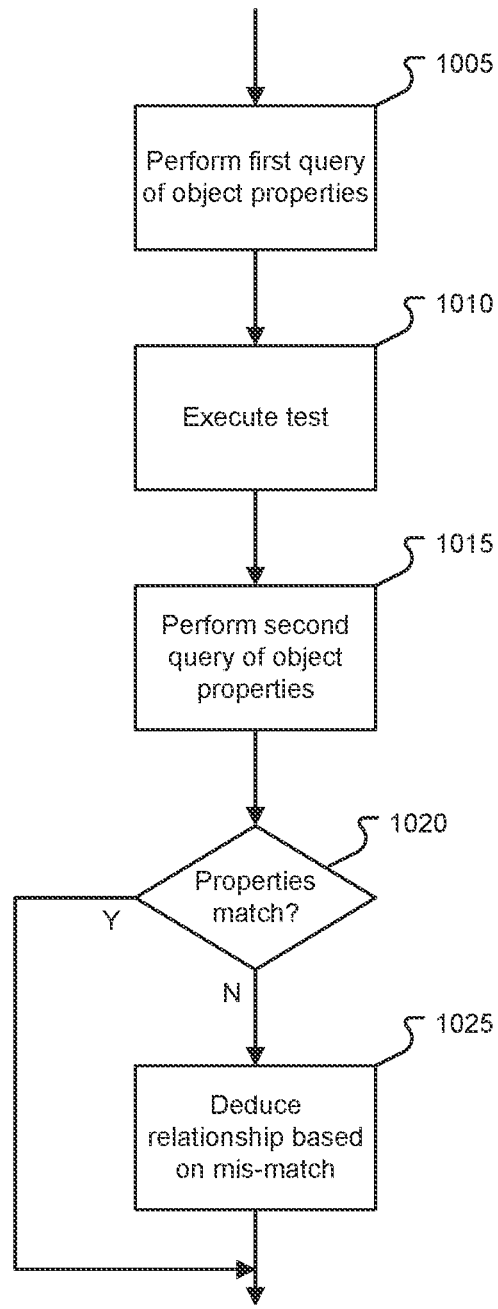
FIG. 10 is a flowchart illustrating additional details of an exemplary process for deducing relationships between steps of a functional test based on queries of properties of objects of steps of the functional test made before and after execution of the functional test according to one embodiment of the present disclosure.

FIG. 10 is a flowchart illustrating additional details of an exemplary process for deducing relationships between steps of a functional test based on queries of properties of objects of steps of the functional test made before and after execution of the functional test according to one embodiment of the present disclosure. As illustrated in this example, deducing relationships between steps of a functional test based on queries of properties of objects of steps of the functional test made before and after execution of the functional test can comprise performing 1005 a first querying on properties of each object of each step of the plurality of steps prior to executing each step. The functional test can then be executed 1010 as described above and a second query can be performed 1015 on the properties of each object of each step after execution of each step. A determination 1020 can then be made by comparing values of the properties of each object of each step obtained from the first query to values of the properties of each object of each step obtained from the second query. In response to determining 1020 the values of the properties of at least one object of at least one step obtained from the first query do not match values of the properties of the at least one object of the at least one step obtained from the second query based on the comparing, it can be deducing 1025 that the at least one step is related to a previous step in the plurality of steps. In response to determining 1020 the values of the properties of at least one object of at least one step obtained from the first query match values of the properties of the at least one object of the at least one step obtained from the second query based on the comparing, no deduction may be made.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for running a functional test on an application, the method comprising:
   executing, by a processor of a testing system, the functional test on the application, the functional test comprising a plurality of steps, the plurality of steps comprising a set of related steps having one or more relationships between each other and a set of one or more independent steps having no relationships to other steps in the plurality of steps;
   deducing, by the processor of the testing system, the one or more relationships between the set of related steps, wherein deducing the one or more relationships between the set of related steps comprises determining whether a step of the plurality of steps causes a window or page navigations and, in response to determining that the step of the plurality of steps causes a window or page navigation, deducing that the step of the plurality of steps that causes the window or page navigation is related to a previous step in the plurality of steps;
   saving, by the processor of the testing system, an indication of the deduced one or more relationships between the set of related steps; and
   re-executing, by the processor of the testing system, the functional test on the application based on the saved indication of the deduced one or more relationships between the set of related steps, wherein re-executing the functional test on the application based on the saved indication of the deduced one or more relationships between the set of related steps comprises executing the set of related steps in serial with each other and executing the set of one or more independent steps in parallel with each other and in parallel with the set of related steps.

2. The method of claim 1, wherein deducing the one or more relationships between the set of related steps further comprises:
   adding a flag on each object of each step of the plurality of steps prior to executing the step of the plurality of steps;
   determining whether the flag exists on each object of each step after executing the step of the plurality of steps;
   in response to determining the flag on each object of a first step exists after executing the first step, deducing that the first step is an independent step; and
   in response to determining the flag on any object of a second step does not exist after executing the second step, deducing that the second step is related to a previous, third step in the plurality of steps.

3. The method of claim 1, wherein deducing the one or more relationships between the set of related steps further comprises:
   adding an event listener on one or more objects of at least one step prior to execution of the step;
   determining whether the event listener detected a change event on the one or more objects of the at least one step during execution of the at least one step;
   in response to determining the event listener detected the change event during execution of the at least one step, deducing that the at least one step is related to a previous step in the plurality of steps; and
   in response to determining the event listener did not detect the event change during execution of the at least one step, deducing that the at least one step is an independent step.

4. The method of claim 1, wherein deducing the one or more relationships between the set of related steps further comprises:
   capturing a first snapshot of each object of each step of the plurality of steps prior to executing each step;
   capturing a second snapshot of each object of each step of the plurality of steps after executing the step;
   comparing the first snapshot of each object of each step of the plurality of steps to the second snapshot of each object of each step of the plurality of steps;
   based on the comparing, determining that the first snapshot of at least one object of at least one step does not match the second snapshot of the at least one object of the at least one step;
   in response to determining that the first snapshot of the at least one object of the at least one step does not match the second snapshot of the at least one object of the at least one step based on the comparing, deducing that the at least one step is related to a previous step in the plurality of steps.

5. The method of claim 1, wherein deducing the one or more relationships between the set of related steps further comprises:
- performing a first querying on properties of each object of each step of the plurality of steps prior to executing each step;
- performing a second query on the properties of each object of each step after execution of each step;
- comparing values of the properties of each object of each step obtained from the first query to values of the properties of each object of each step obtained from the second query;
- based on the comparing, determining that the properties of each object of each step obtained from the first query to values of the properties of each object of each step obtained from the second query; and
- in response to determining that the values of the properties of at least one object of at least one step obtained from the first query do not match values of the properties of the at least one object of the at least one step obtained from the second query based on the comparing, deducing that the at least one step is related to a previous step in the plurality of steps.

6. The method of claim 1, wherein executing the function test on the application comprises executing a script that navigates a plurality of elements of a user interface of the application.

7. The method of claim 1, wherein the one or more relationships comprises at least one relationship in which execution of a step in the set of related steps depends upon completion of another step in the set of related steps.

8. A system comprising:
- a processor; and
- a memory coupled with and readable by the processor and storing therein a set of instructions which, when executed by the processor, causes the processor to run a functional test on an application by:
  - executing the function test on the application, the functional test comprising a plurality of steps, the plurality of steps comprising a set of related steps having one or more relationships between each other and a set of one or more independent steps having no relationships to other steps in the plurality of steps;
  - deducing the one or more relationships between the set of related steps, wherein deducing the one or more relationships between the set of related steps comprises determining whether a step of the plurality of steps causes a window or page navigations and, in response to determining that the step of the plurality of causes a window or page navigation, deducing that the step of the plurality of steps that causes the window or page navigation is related to a previous step in the plurality of steps;
  - saving an indication of the deduced one or more relationships between the set of related steps; and
  - re-executing the functional test on the application based on the saved indication of the deduced one or more relationships between the set of related steps wherein re-executing the functional test on the application based on the saved indication of the deduced one or more relationships between the set of related steps comprises executing the set of related steps in serial with each other and executing the set of one or more independent steps in parallel with each other and in parallel with the set of related steps.

9. The system of claim 8, wherein deducing the one or more relationships between the set of related steps further comprises:
- adding a flag on each object of each step of the plurality of steps prior to executing the step of the plurality of steps;
- determining whether the flag exists on each object of each step after executing the step of the plurality of steps;
- in response to determining the flag on each object of a first step exists after executing the first step, deducing that the first step is an independent step; and
- in response to determining the flag on any object of a second step does not exist after executing the second step, deducing that the second step is related to a previous, third step in the plurality of steps.

10. The system of claim 8, wherein deducing the one or more relationships between the set of related steps further comprises:
- adding an event listener on one or more objects of at least one step prior to execution of the step;
- determining whether the event listener detected a change event on the one or more objects of the at least one step during execution of the at least one step;
- in response to determining the event listener detected the change event during execution of the at least one step, deducing that the at least one step is related to a previous step in the plurality of steps; and
- in response to determining the event listener did not detect the event change during execution of the at least one step, deducing that the at least one step is an independent step.

11. The system of claim 8, wherein deducing the one or more relationships between the set of related steps further comprises:
- capturing a first snapshot of each object of each step of the plurality of steps prior to executing each step;
- capturing a second snapshot of each object of each step of the plurality of steps after executing the step;
- comparing the first snapshot of each object of each step of the plurality of steps to the second snapshot of each object of each step of the plurality of steps;
- based on the comparing, determining that the first snapshot of at least one object of at least one step does not match the second snapshot of the at least one object of the at least one step;
- in response to determining the first snapshot of at least one object of at least one step does not match the second snapshot of the at least one object of the at least one step based on the comparing, deducing that the at least one step is related to a previous step in the plurality of steps.

12. The system of claim 8, wherein deducing the one or more relationships between the set of related steps further comprises:
- performing a first querying on properties of each object of each step of the plurality of steps prior to executing each step;
- performing a second query on the properties of each object of each step after execution of each step;
- comparing values of the properties of each object of each step obtained from the first query to values of the properties of each object of each step obtained from the second query;
- based on the comparing, determining that the properties of each object of each step obtained from the first query to values of the properties of each object of each step obtained from the second; and in response to determining the values of the properties of at least one object of at least one step obtained from the first query do not match values of the properties of the at least one object of the at least one step obtained from the second query based on the comparing, deducing that the at least one step is related to a previous step in the plurality of steps.

13. The system of claim 8, wherein executing the function test on the application comprises executing a script that navigates a plurality of elements of a user interface of the application.

14. The system of claim 8, wherein the one or more relationships comprises at least one relationship in which execution of a step in the set of related steps depends upon completion of another step in the set of related steps.

15. A non-transitory, computer-readable medium comprising a set of instructions stored therein which, when executed by a processor, causes the processor to run a functional test on an application by:
   executing the functional test on the application, the functional test comprising a plurality of steps, the plurality of steps comprising a set of related steps having one or more relationships between each other and a set of one or more independent steps having no relationships to other steps in the plurality of steps;
   deducing the one or more relationships between the set of related steps, wherein deducing the one or more relationships between the set of related steps comprises determining whether a step of the plurality of steps causes a window or page navigations and, in response to determining that the step of the plurality of steps causes a window or page navigation, deducing that the step of the plurality of steps that causes the window or page navigation is related to a previous step in the plurality of steps;
   saving an indication of the deduced one or more relationships between the set of related steps; and
   re-executing the functional test on the application based on the saved indication of the deduced one or more relationships between the set of related steps, wherein re-executing the functional test on the application based on the saved indication of the deduced one or more relationships between the set of related steps comprises executing the set of related steps in serial with each other and executing the set of one or more independent steps in parallel with each other and in parallel with the set of related steps.

16. The non-transitory, computer-readable medium of claim 15, wherein deducing the one or more relationships between the set of related steps further comprises:
   adding a flag on each object of each step of the plurality of steps prior to executing the step of the plurality of steps;
   determining whether the flag exists on each object of each step after executing the step of the plurality of steps;
   in response to determining the flag on each object of a first step exists after executing the first step, deducing that the first step is an independent step; and
   in response to determining the flag on any object of a second step does not exist after executing the second step, deducing that the second step is related to a previous, third step in the plurality of steps.

17. The non-transitory, computer-readable medium of claim 15, wherein deducing the one or more relationships between the set of related steps further comprises:
   adding an event listener on one or more objects of at least one step prior to execution of the step;
   determining whether the event listener detected a change event on the one or more objects of the at least one step during execution of the at least one step;
   in response to determining the event listener detected the change event during execution of the at least one step, deducing that the at least one step is related to a previous step in the plurality of steps; and
   in response to determining the event listener did not detect the event change during execution of the at least one step, deducing that the at least one step is an independent step.

18. The non-transitory, computer-readable medium of claim 15, wherein deducing the one or more relationships between the set of related steps further comprises:
   capturing a first snapshot of each object of each step of the plurality of steps prior to executing each step;
   capturing a second snapshot of each object of each step of the plurality of steps after executing the step;
   comparing the first snapshot of each object of each step of the plurality of steps to the second snapshot of each object of each step of the plurality of steps;
   based on the comparing, determining that the first snapshot of at least one object of at least one step does not match the second snapshot of the at least one object of the at least one step;
   in response to determining the first snapshot of at least one object of at least one step does not match the second snapshot of the at least one object of the at least one step based on the comparing, deducing that the at least one step is related to a previous step in the plurality of steps.

19. The non-transitory, computer-readable medium of claim 15, wherein deducing the one or more relationships between the set of related steps further comprises:
   performing a first querying on properties of each object of each step of the plurality of steps prior to executing each step;
   performing a second query on the properties of each object of each step after execution of each step;
   comparing values of the properties of each object of each step obtained from the first query to values of the properties of each object of each step obtained from the second query;
   based on the comparing, determining that the properties of each object of each step obtained from the first query to values of the properties of each object of each step obtained from the second query; and
   in response to determining the values of the properties of at least one object of at least one step obtained from the first query do not match values of the properties of the at least one object of the at least one step obtained from the second query based on the comparing, deducing that the at least one step is related to a previous step in the plurality of steps.

20. The non-transitory, computer-readable medium of claim 15, wherein the one or more relationships comprises at least one relationship in which execution of a step in the set of related steps depends upon completion of another step in the set of related steps.

* * * * *